United States Patent [19]

Broughman, Jr. et al.

[11] Patent Number: 4,683,745
[45] Date of Patent: Aug. 4, 1987

[54] CANNISTER SEAL INTEGRITY TESTER

[75] Inventors: John D. Broughman, Jr.; Barry G. Calvert; Danny B. Hill, all of Covington, Va.

[73] Assignee: Westvaco Corporation, New York, N.Y.

[21] Appl. No.: 901,201

[22] Filed: Aug. 28, 1986

[51] Int. Cl.⁴ .............................................. G01M 3/26
[52] U.S. Cl. ........................................ 73/49.2; 73/40
[58] Field of Search ................... 73/37, 49.2, 49.3, 52, 73/45.3, 40

[56] References Cited

U.S. PATENT DOCUMENTS

| | | | |
|---|---|---|---|
| 2,960,223 | 11/1960 | Fauth | 73/52 |
| 3,012,432 | 12/1961 | Moore et al. | 73/49.2 |
| 3,369,392 | 2/1968 | Christensson | 73/49.2 |
| 4,078,421 | 3/1978 | Gastaldo et al. | 73/49.2 |
| 4,172,477 | 10/1979 | Reich | 73/49.2 |
| 4,291,573 | 9/1981 | Richter et al. | 73/37 |
| 4,459,843 | 7/1984 | Durham | 73/37 |
| 4,555,935 | 12/1985 | Elert | 73/37 |
| 4,587,619 | 5/1986 | Converse, Jr. | 73/49.2 |

FOREIGN PATENT DOCUMENTS

| | | | |
|---|---|---|---|
| 2124198 | 3/1971 | Fed. Rep. of Germany | 73/49.2 |
| 2836122 | 3/1979 | Fed. Rep. of Germany | 73/52 |
| 34335 | 2/1983 | Japan | 73/49.2 |
| 243934 | 12/1961 | U.S.S.R. | 73/49.2 |
| 728085 | 4/1980 | U.S.S.R. | 73/49.3 |

Primary Examiner—Stewart J. Levy
Assistant Examiner—Hezron E. Williams
Attorney, Agent, or Firm—W. A. Marcontell; R. L. Schmalz

[57] ABSTRACT

A method and apparatus is taught for rapidly implementing a semiautomatic vacuum test of food cannisters prior to filling. Unit numbers of completely formed but unfilled cannisters are manually positioned on vacuum mandrels and the test sequence started. Progress of the sequence is controlled automatically and concluded by a digital value report of the unit seal quality. Test productivity is maximized by preparing a second unit number of cannisters for test, as the test sequence for a first unit number of cannisters progresses. Should a number of cannisters fail a test sequence, means are provided to test each cannister individually to determine the exact cause of failure.

3 Claims, 5 Drawing Figures

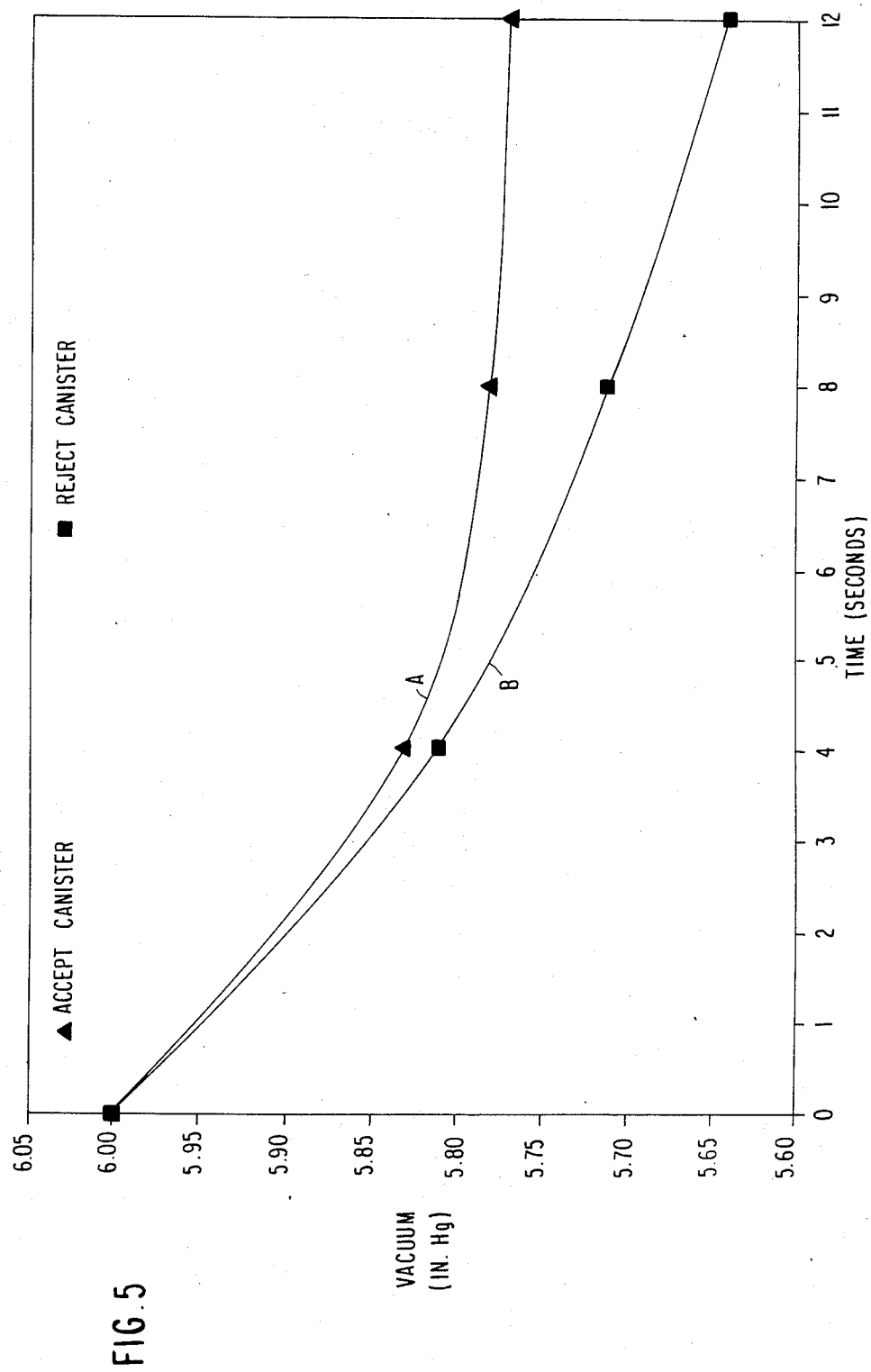

CANNISTER SEAL INTEGRITY TESTER

BACKGROUND OF THE INVENTION

1. Field of Invention

The present invention relates to quality control procedures and apparatus for testing the seal integrity of cannisters such a food and beverage containers.

2. Description of the Prior Art

A high degree of quality control is essential to containerization of food products for retail marketing. Such containers are frequently formed, filled and sealed on a continuous and automatic process line. Consequently, testing for cannister construction and seal integrity is a problematic procedure of extracting samples from a continuous process line for detailed examination. The greater the number and frequency of sampling, the greater the test reliability. To support high production rates, the test must be rapid and reliable as well.

For seal integrity, a test usually involves a gas pressure measurement such as that taught by U.S. Pat. No. 4,555,935 to K. Elert or a flexure measurement of the filled and sealed product such as that taught by U.S. Pat. No. 2,960,223 to F. E. Fauth. With traditional metallic containers, many years of experience have proven the reliability of such tests. However, as new container materials such as plastics and paper have emerged, testing procedures and equipment developed for metal containers are being found inappropriate for the new materials. For example, when a metal cannister is subjected to a pressure differential, whether an internal pressure or vacuum, structural distortion is immediate. Under the same pressure differential condition, structural distortion of a paper cannister is a delayed creep.

It is, therefore, an object of the present invention to provide a rapid and reliable seal integrity test procedure for containers that have a delayed distortion response to a pressure differential.

Another object of the invention is to provide an apparatus that will rapidly and reliably test a number of delayed distortion response containers simultaneously.

Another object of the present invention is to provide a semiautomatic container testing procedure and apparatus.

SUMMARY OF THE INVENTION

These and other objects of the invention as will subsequently become apparent are taught by an apparatus and corresponding operational process which includes a number of individual cannister vacuum mandrels that are evacuated by a common manifold system. The open tops of unfilled but form-finished cannister samples are placed over the mandrels manually and the automatic test sequence started. Initially, a predetermined degree of vacuum is drawn within the internal volume of cannisters served by the common manifold. When the predetermined initial vacuum is reached, the vacuum source is isolated from the cannisters. Thereafter the residual cannister vacuum is automatically measured at 1 or 2 second intervals by a vacuum transmitter and a signal proportional to the momentary condition reported to a data memory bank. This measuring and reporting process is continued for 15 to 20 seconds whereupon the process controller calculates from the previously stored data and reports a vacuum loss rate. Such loss rate is displayed visually for manual evaluation or further processed for automatic comparison to acceptable limits. An alarm or other attention seizing means may be employed in the event of an unacceptable limit report. Additional means are provided for manual progression through each of the several cannisters on a common manifold system to determine which one or ones are defective.

BRIEF DESCRIPTION OF THE DRAWINGS

Relative to the drawings wherein like reference characters designate like or similar elements throughout the several figures of the drawings:

FIG. 5 is a time-vacuum degredation curve representative of the present invention process.

DESCRIPTION OF THE ILLUSTRATED EMBODIMENT

Figure 1:
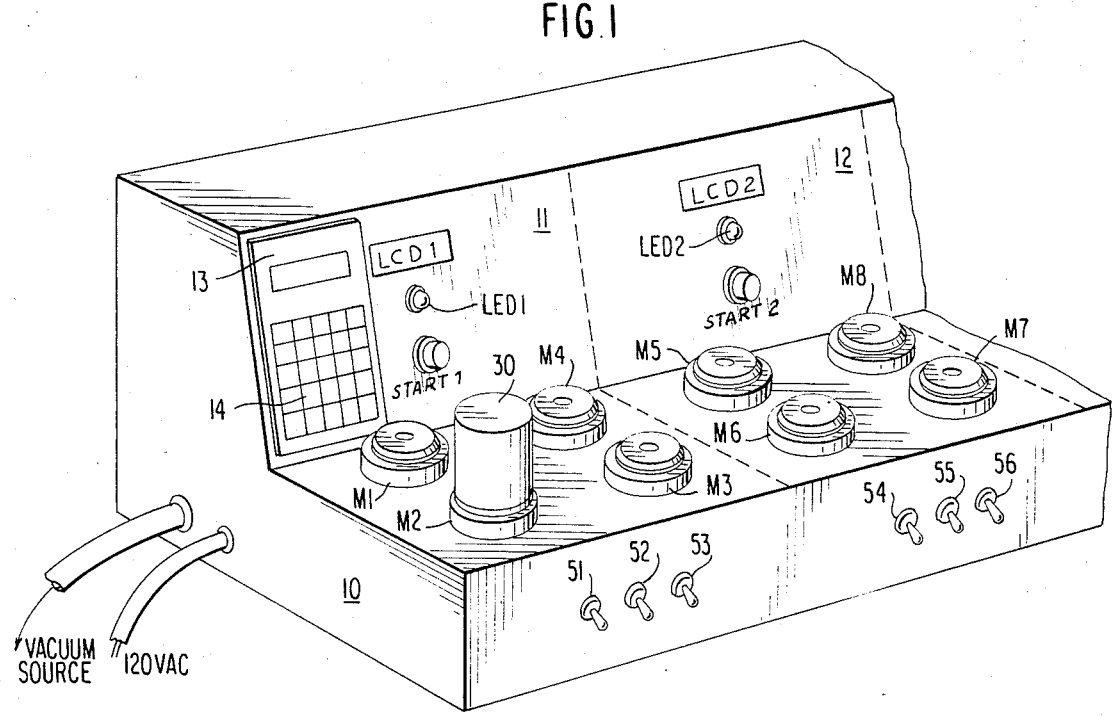
FIG. 1 is a pictorial view of the present invention apparatus console.

FIG. 1 illustrates a representative console layout of the several invention components within a cabinet structure 10. It is understood that the particular layout design used, cabinet configuration or even the use of a unitizing cabinet is not an essential element of the invention. As shown by FIG. 1, the cabinet structure is broken along the right side to represent the fact that the cabinet continues indefinitely as a repetition of the pair of test units 11 and 12 as shown.

Individual test units 11 and 12, respectively, are combined to form a pair under the operational direction of a single computational controller 13. There are four vacuum mandrels, M1 through M4, assigned to unit 11. Mandrels M5 through M8 are assigned to unit 12. Both mandrel groups are evacuated by the same vacuum source. A 120 volt a.c. power connection serves the electrical energy needs of the invention.

A test run sequence on unit 11 is started manually with push-button switch START 1. Unit 12 is started with switch START 2. Light emitting diodes LED1 and LED2 indicate to the operator that a test sequence on the respective unit is in progress. Test results on a respective unit are reported digitally by liquid crystal displays LCD1 and LCD2. Manual switches 51 through 53 are used to isolate individual defective cannisters that have, by a previous unit test, been identified as present in the test group respective to mandrels M1 through M4 of Unit 11. Manual switches 54 through 56 are used for the same purpose respective to unit 12.

Preferably, computational controller 13 is of the programmable type such as the Chameleon Model 50 KM1000 product of the Fischer and Porter Company, Warminster, Pa. Program parameters are entered into the controller logic by means of a keyboard 14.

Figure 2:
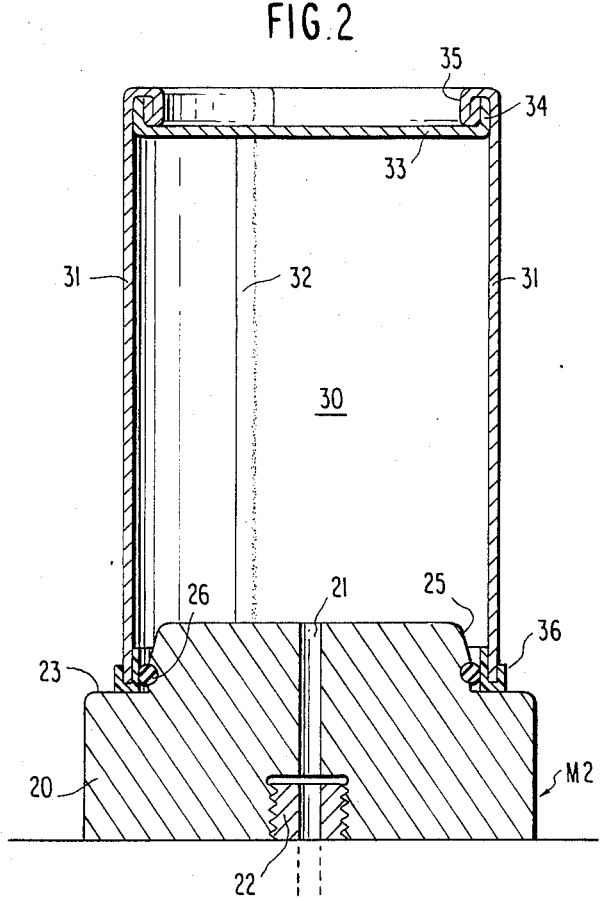
FIG. 2 is a sectional detail of a vacuum mandrel having a paperboard cannister sealed thereto.

Construction details of the vacuum mandrels M1 through M8 are shown by FIG. 2. A solid aluminum base block 20 is center bored for a vacuum conduit 21. A threaded counter bore coaxial with the vacuum conduit receives a threaded stub fitting 22 for a sealed connection with a vacuum source manifold. The top rim of the base block is stepped to provide an annular abutment plane Z3 for support and alignment of a cannister rim. An O-ring 26 around a tapered plug portion 25 serves as the vacuum seal element.

Shown as sealed to the mandrel M2 is a single-wall thickness paperboard cannister 30 which comprises a rectangular sheet of polymer coated paperboard 31 rolled into a cylinder and secured by a heat fused lap seam 32. The exposed, cut edges of the cannister filling end are protected by a formed, thermoplastic lip 36. A circular cut, bottom end piece 33 is given a formed lip 34 which is inserted into the cuff-roll 35 of the cylinder bottom edges. This cuff-roll assembly is secured and sealed by heating and crimping the polymer coat on the paperboard sheet stock.

Figure 3:
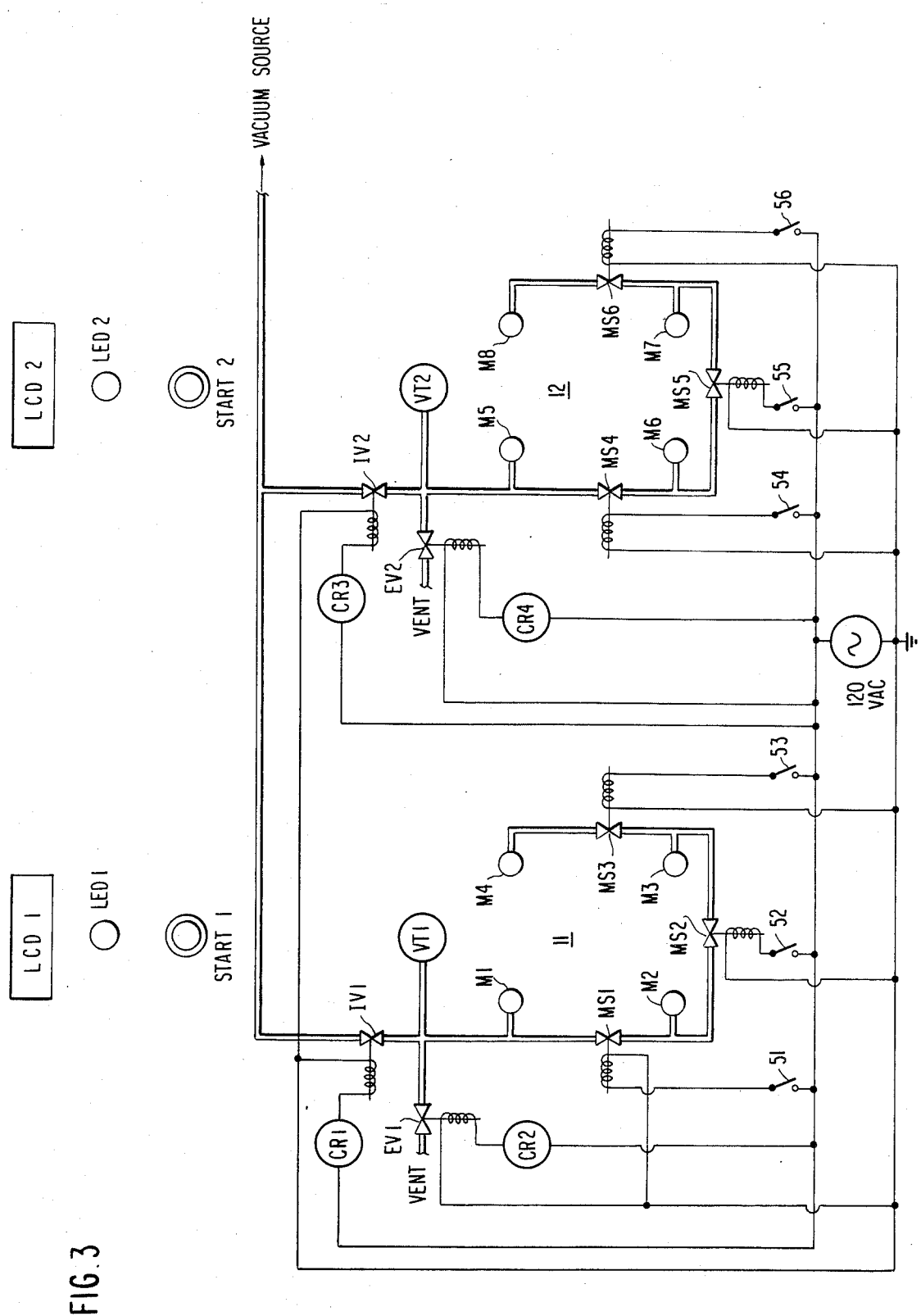
FIG. 3 is a vacuum distribution and control schematic.

Referring next to the schematic of FIG. 3, the double line system represents the vacuum conduit service to the eight mandrels of the two test units of a pair under the control of a single controller 13. The single line system represents electrical power distribution to the several solenoid valves within the vacuum system.

To isolate the individual test units 11 and 12 from the common vacuum source, solenoid isolation valves IV1 and IV2 are line positioned in respective service spurs from the common vacuum manifold. These are normally closed, energize open valves that are directly connected to operating power by control relays CR1 and CR3.

At the end of a test sequence, it is normally necessary to relieve the vacuum drawn within the closed system of a unit isolated by the valves IV1 and IV2. Normally closed, energize open release valves EV1 and EV2 serve this function under the power control of relays CR2 and CR4, respectively.

Manually controlled, normally open, energize closed solenoid valves MS1 through MS6 may be manipulated to progressively isolate one or more of the mandrel stations of a respective test unit. Expansively, by manually closing switch S1, solenoid valve MS1 is closed to isolate mandrel station M2, M3 and M4 from a test sequence that is performed exclusively on mandrel station M1. Similarly, closure of switch S2 isolates mandrel stations M1 and M2, jointly, by the closure of valve MS2.

Also connected to the vacuum system on the isolated unit side of each isolation valve IV1 and IV2 are vacuum transmitter instruments VT1 and VT2. These instruments provide the computational controller 13 electric signal data proportional to the momentary vacuum pressure existing in a respective test unit 11 and 12.

Figure 4:
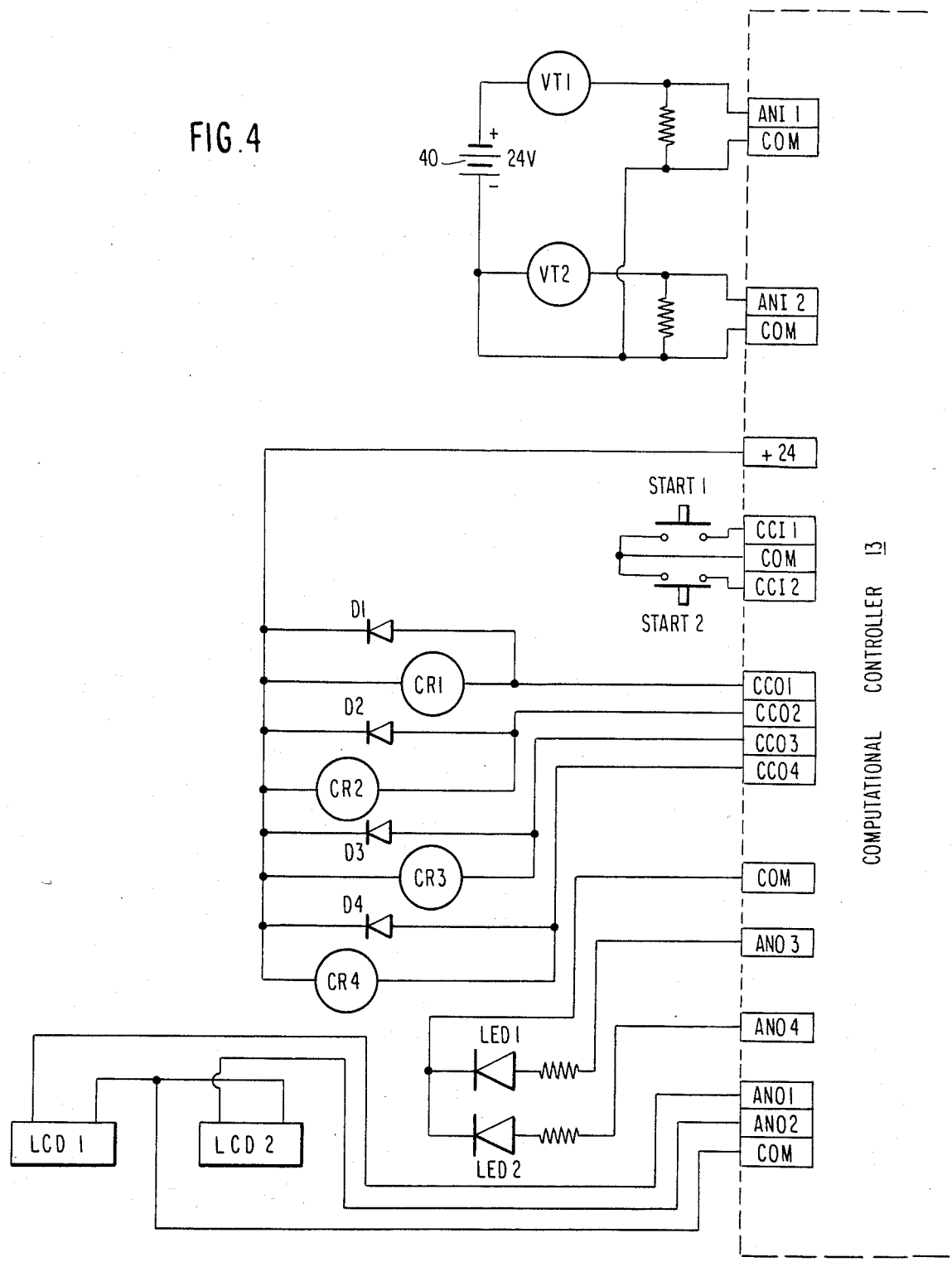
FIG. 4 is an electric wiring schematic.

With further reference to the control schematic of FIG. 4, the several aforedescribed external control elements of the invention are shown by appropriate reference and signal connection to the computational controller 13. Here we see that respective test unit starting switches START 1 and START 2 are mutually connected to a common ground terminal COM and to contact closure input terminals CCI1 and CCI2, respectively. Vacuum transmitter instruments VT1 and VT2 are provided an independent d.c. power source 40 and signal connected to analog input terminals ANI1 and ANI2, respectively. Within the controller internal circuitry, the vacuum analog proportional signals respective to VT1 and VT2 are converted to corresponding digital signals which may be relayed through analog output terminals AN01 and AN02, respectively, to liquid crystal display panels LCD1 and LCD2.

Analog output terminals AN03 and AN04 are used to energize light emitting diodes LED1 and LED2, respectively, throughout the time a test sequence respective to units 11 and 12 is in progress.

Contact control output terminals CCO1 and CC03 issue the energization signals to contact relays CR1 and CR3 for timely closure of vacuum isolation valves IV1 and IV2, respectively. Similarly, contact control output terminals CC02 and CC04 issue the energization signals to contact relays CR2 and CR4 to open vacuum release valves EV1 and EV2, respectively.

In operation, test samples of cannisters 30 are inverted and positioned over the plug element 25 of mandrels M1, M2, M3 and M4 into uniform abutment with the shoulder 23. This seals the cannister rim to the O-ring 26. With all mandrels of the unit 11 covered, the START 1 switch is manually closed to start the test sequence running. This begins with an opening of isolation valve IV1 until the vacuum transmitter instrument VT1 signals the controller 13 that a magnitude of vacuum within the system has reached a programmed set-point e.g. 6 inches of mercury, for example. Closure of switch START 1 also illuminates light emitting diode LED1 to inform the operator that the sequence is in progress.

When the starting vacuum has been reached, isolation valve IV1 is closed and a controller 13 memory recording made of the starting vacuum pressure. A digital report of the starting vacuum may be displayed by LCD1.

From the moment of valve IV1 closure, a time measurement is made and the momentarily prevailing vacuum is recorded every 4 seconds for example. For each subsequent recording, the controller 13 computes the vacuum differential from the previous recording or from the initial pressure, calculates the rate of pressure change and displays the calculated result on LCD1.

At the end of the predetermined test period, 12 seconds for example, a final vacuum loss rate is calculated and displayed on LCD1 for subjective evaluation by the operator. Also, the exhaust valve EV1 is opened to break the vacuum within the respective cannisters.

This process is represented graphically by FIG. 5 which plots the course time related vacuum degradation for acceptable and unacceptable cannisters, respectively. The curve of acceptable cannisters is designated A and unacceptable cannisters designated B. The total elapsed time of the test is divided into three segments; starting, intermediate and final. The starting third of the test, from instant zero to four seconds thereafter reflects the initial structural creep of the test cannister. The curve slope is in the order of 1 but a small difference is noted between the slope of an acceptable cannister and one that is not. Controller 13 may be programmed to interrupt continuation of a test sequence based solely on the starting curve segment. For example, a negative slope of 2 is sufficiently apart from an acceptable norm as to provide confident basis for a rejection conclusion.

Over the intermediate test segment, from time 4 sec. to time 8 sec. the slope difference between acceptable and unacceptable cannisters increases. On the basis of a comparative intermediate segment set point, the controller calculated slope test result at the eighth second may be used as basis to continue or terminate the test.

Independent of the two foregoing test segments, the final test segment, from second 8 to second 12 is the most significant for determining cannister acceptability. Throughout this final segment, the curve slope of an acceptable cannister should approach zero. A slope greater than 25% generally indicates leakage.

As a test sequence on unit 11 progresses automatically, mandrels M5, M6, M7 and M8 are manually covered by additional cannisters 30 and the sequence started for unit 12.

In the event that a group of cannisters 30 on unit 11 collectively test with an unacceptably low vacuum loss rate, the switch S1 is closed to close valve MS1 and isolate mandrels M2, M3 and M4 from mandrel M1. The test sequence is then repeated. From a test of mandrel M1, exclusively, the cannister 30 respective to M1 is proven acceptable or unacceptable. If acceptable, valve MS1 is opened, valve MS2 is closed and the test repeated again. This process is repeated until the faulty cannister of the group is identified.

Having fully disclosed an illustrated embodiment of our invention, we claim:

1. A process for testing the fabrication seal integrity of unfilled containers comprising the steps of:
    a. temporarily sealing an open end of an unfilled container;
    b. drawing a predetermined initial vacuum pressure value within the internal volume of said container;
    c. at a starting moment, isolating the internal volume of said container upon reaching said predetermined initial vacuum pressure value;
    d. continuously monitoring the vacuum pressure within said isolated container volume over a predetermined total test time;
    e. memory noting internal volume vacuum pressure values for said starting moment and for at least two successive later moments terminating substantially equal time intervals;
    f. determining a first vacuum loss rate value for said internal volume from the first elapsed time interval and the differential between said starting moment and the first of said successive moment vacuum pressure values;
    g. making a first comparison of said first vacuum loss rate to a first set-point value;
    h. making a first decision to terminate or continue said test process on the basis of said first comparison;
    i. when said process is continued, determining a second vacuum loss rate value from a second elapsed time interval and the vacuum pressure value differential over said second elapsed time interval;
    j. making a second comparison of said second vacuum loss rate to a second set-point value that is distinctive from said first set-point value; and,
    k. making a second decision to accept or reject said container on the basis of said second comparison.

2. A process as described by claim 1 wherein the first elapsed time interval is about one-third of the total test time.

3. A process as described by claim 2 wherein the second elapsed time interval is approximately the second third of the total test time.

* * * * *